(12) United States Patent
Price (10) Patent No.: US 6,427,031 B1
(45) Date of Patent: Jul. 30, 2002

(54) METHOD FOR REMOVING ARTIFACTS IN AN ELECTRONIC IMAGE DECODED FROM A BLOCK-TRANSFORM CODED REPRESENTATION OF AN IMAGE

(75) Inventor: Jeffrey R. Price, Atlanta, GA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,485

(22) Filed: Dec. 31, 1998

(51) Int. Cl.[7] .................................................. G06K 9/40
(52) U.S. Cl. ....................................... 382/264; 382/260
(58) Field of Search ................................. 382/260–269, 382/254, 275; 358/1.9

(56) References Cited

U.S. PATENT DOCUMENTS

| | | | | |
|---|---|---|---|---|
| 5,555,028 A | * | 9/1996 | Kim ............................ | 358/407 |
| 5,555,029 A | * | 9/1996 | Kim ............................ | 358/407 |
| 5,852,475 A | | 12/1998 | Gupta et al. ................ | 348/606 |
| 5,852,682 A | | 12/1998 | Kim ............................ | 382/268 |
| 5,926,292 A | * | 7/1999 | Ishikawa et al. ............ | 358/534 |
| 6,178,205 B1 | * | 1/2001 | Cheung et al. ........ | 375/240.29 |
| 6,298,161 B1 | * | 10/2001 | Koo et al. ................... | 382/233 |

FOREIGN PATENT DOCUMENTS

| | | | | |
|---|---|---|---|---|
| EP | 0 585 573 A2 | 3/1994 | ............ | H04N/7/13 |

OTHER PUBLICATIONS

"A Method for Enhancing the Picture Quality of Low Bit–Rate Block–Coded Images" by D.G. Sampson, D.V. Papadimitriou, M. Ghanbari and T.J. Dennis, Fifth International Conference on Image Processing and its Applications (Conf. Publ. No. 410), Jul. 4–6, 1995, pp. 40–44.

"Digital Picture Processing vol. 2" A. Rpsemfield and A.C. Kak. Academic Press, Orlando, US, 1987, p.86.

"Blocking Effect Reduction of JPEG Images by Signal Adaptive Filtering" by Y.L. Lee, H.C. Kim and H.W. Park. IEEE Transactions on Image Processing, U.S. IEEE, Inc. NY, vol. 7, No. 2, Feb. 1, 1998, pp. 229–234.

"Nonlinear Space–Variant Postprocessing of Block Coded Images" by Bhaskar Ramamurthi and Allen Gersho. IEEE Transactation on Acoustics, Speech and Signal Processing, U.S. IEEE Inc. New York, vol. 34, No. 5, Oct. 1, 1986, pp. 1258–1268.

William B. Pennebaker, Joan L. Mitchell, "*JPEG Enhancements*", *JPEG Still Image Data Compression Standard*, 1993, pp. 261–265.

\* cited by examiner

*Primary Examiner*—Thomas D. Lee
*Assistant Examiner*—Stephen Brinich
(74) *Attorney, Agent, or Firm*—David M. Woods (57) ABSTRACT

A method for preventing artifacts in an electronic image decoded from a block-transform coded representation of an image, the method comprises the steps of: receiving blocks of the electronic image decoded from the transform-coded representation of the image; determining whether a portion of the decoded image contains low detail pixels; determining boundary pixels as pixels within a predetermined area of a predetermined number of low detail pixels; filtering the boundary pixels with one of a plurality of directionally-oriented smoothing filters for obtaining one or more boundary replacement pixel values; and reconstructing the image by replacing one or more pixels in the boundary with one or more of the boundary replacement pixel values.

26 Claims, 6 Drawing Sheets

METHOD FOR REMOVING ARTIFACTS IN AN ELECTRONIC IMAGE DECODED FROM A BLOCK-TRANSFORM CODED REPRESENTATION OF AN IMAGE

CROSS-REFERENCE TO RELATED APPLICATIONS

The present application is related to U.S. Pat. No. 5,737, 451 issued Apr. 7, 1998 by Gandhi et al., and entitled, "A Method and Apparatus for Suppressing Blocking Artifacts in Block-Transform Coded Images".

MICROFICHE APPENDIX

The disclosure in the microfiche appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The invention relates generally to the field of image processing and, more particularly, to removing artifacts resulting from block-transform coded images.

BACKGROUND OF THE INVENTION

Various numerically lossy compression methods are used in digital image processing to compress image data prior to transmission from one computer workstation to another computer workstation where the image data is decompressed (i.e., reconstructed). A well-known compression method employs a discrete cosine transform (DCT), such as lossy JPEG (Joint Photographic Expert Group) international standard.

In this regard, a digital representation of an image is divided into a plurality of non-overlapping, contiguous 8×8 blocks of pixel data. Each non-overlapping 8×8 pixel block of image data is then transformed, via the DCT, from a pixel representation space into a DCT representation space. Each transformed block of image data is comprised of one DC coefficient and 63 AC coefficients. The DC coefficient represents the average brightness of the block and the AC coefficients represent the spatial frequency information in the block.

During the coding process, the DC and AC coefficients for each block are quantized and encoded into a bit-stream prior to any transmission to another computer workstation. Quantization, in effect, introduces numerical loss by mapping a range of coefficient values to one value, which mapping is referred to hereinafter as a quantization level. Encoding assigns a binary code to the resulting set of quantized values. At the receiving workstation, the bit-stream is decoded and dequantized to reconstruct the set of dequantized coefficient values. These dequantized coefficients are subsequently transformed back into the pixel representation space via an inverse discrete cosine transform (IDCT), as is well known in the art.

At the compression workstation, the number of bits generated by the compression process corresponds, in part, to the number of quantization levels used in the quantization. Using a fewer number of quantization levels, coarse quantization, will generate a fewer number of bits than a less coarse quantization. However, coarse quantization introduces undesirable artifacts at the decoding workstation. Coarse quantization may increase the disparity between the DC coefficients of neighboring blocks, and it may destroy AC coefficient information within a block. This results in artifacts that are oftentimes visually more objectionable in regions of slowly varying intensity.

As used herein, an image region is said to be "low detail" if it contains relatively low spatial frequency information, as is the case in regions of slowly varying intensity. Additionally, an image region is said to be "boundary" if it is near a low detail region.

A standard technique for reducing blocking artifacts is known as AC prediction, such as that referenced by Mitchell, J. L. and W. B. Pennebaker "JPEG ENHANCEMENTS" *Still Image Data Compression Standard* 1993, page 261–265, and is applied at the decompression workstation. AC prediction for low frequency AC coefficients is formed using dequantized DC coefficients from the current block and its eight nearest neighbor blocks. The AC predicted coefficient values for the block replace the zero-quantized AC coefficient values (i.e., those that have been quantized to zero) prior to transforming the image back into the pixel representation space. One shortcoming of this technique is that the AC predicted coefficients replace the zero-quantized AC coefficient values regardless of the other spatial frequency content of the block. This has the undesirable tendency of visually smoothing out high frequency image detail, and of introducing low frequency AC information which has no effect in reducing the disparity of dequantized DC coefficients between neighboring blocks.

An adaptive method for reducing blocking artifacts is disclosed in an European Patent Application 0585573A2 by De Garido et. al. An adaptive AC Predictor is based on a prescribed activity measure of the current image block and its eight nearest neighbor blocks. This technique, unlike the above-described method, does not introduce low frequency information via AC prediction in high spatial frequency areas; thus, high spatial frequency and texture information which is indicative of high activity blocks is preserved. This adaptive AC prediction technique still has the disadvantage of not reducing the disparity of the dequantized DC coefficients between neighboring blocks in low activity image areas.

Consequently, a need exists for improvements in the decompression of block-transform coded images so as to overcome the above-described drawbacks.

SUMMARY OF THE INVENTION

The present invention is directed to overcoming one or more of the problems set forth above. Briefly summarized, according to one aspect of the present invention, the invention resides in a method for preventing artifacts in an electronic image decoded from a block-transform coded representation of an image, the method comprising the steps of: (a) receiving blocks of the electronic image decoded from the transform-coded representation of the image; (b) determining whether a portion of the decoded image contains low detail pixels; (c) determining boundary pixels as pixels within a predetermined area of a predetermined number of low detail pixels; (d) based on step 1(c), filtering the boundary pixels with one of a plurality of directionally-oriented smoothing filters for obtaining one or more boundary replacement pixel values; and (e) reconstructing the image by replacing one or more pixels in the boundary with one or more of the boundary replacement pixel values.

These and other aspects, objects, features and advantages of the present invention will be more clearly understood and appreciated from a review of the following detailed description of the preferred embodiments and appended claims, and by reference to the accompanying drawings. Note also that the description to follow details the operation of the present invention on either a monochrome image or on one channel (the luminance channel) of a color image. The extension of the invention to the other channels (the chrominance channels) of a color image will be described at the end of the detailed description.

ADVANTAGEOUS EFFECT OF THE INVENTION

The present invention has the following advantage of identifying regions containing low spatial frequency information and boundary regions near them, and of performing a unique smoothing operation according to the identified content.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
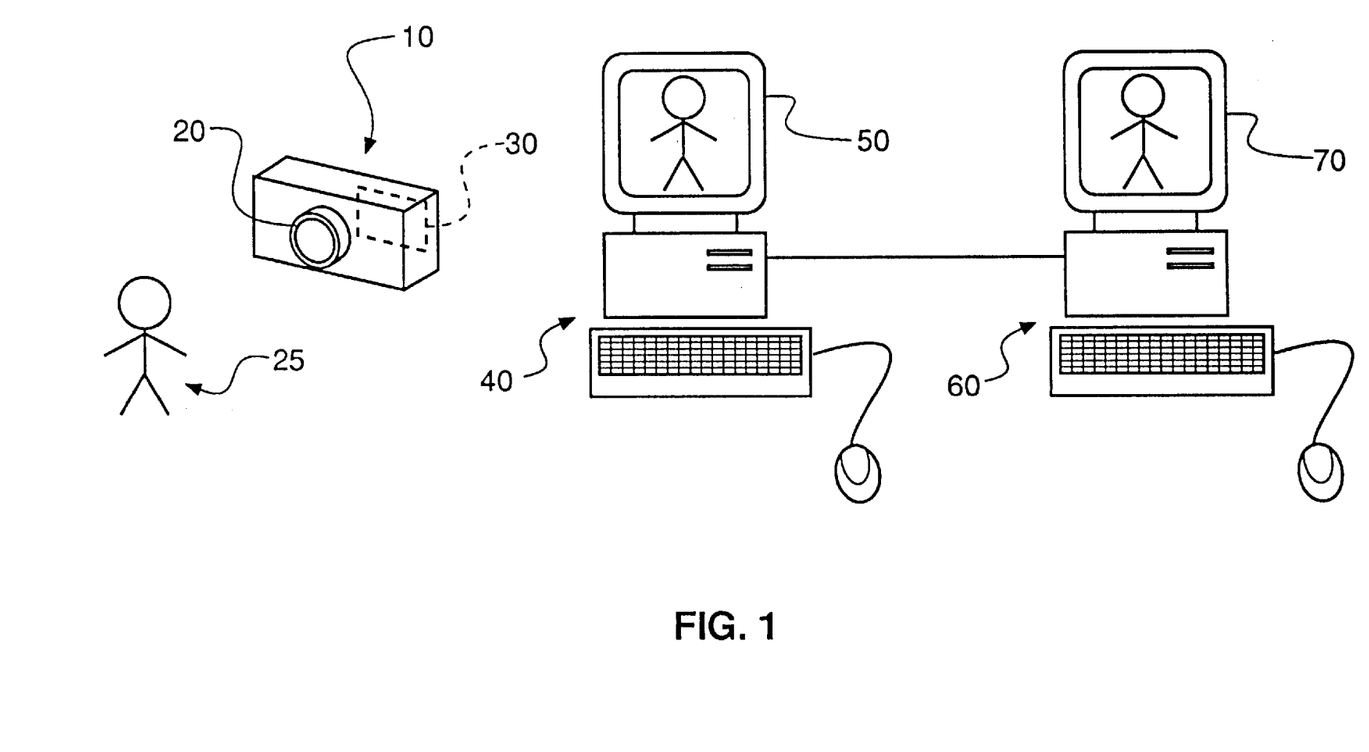
FIG. 1 is a perspective drawing illustrating a typical computer system for implementing the present invention.

Referring to FIG. 1, there is shown a system for implementing the present invention. A digital camera 10, such as a "KODAK" DC 50, includes a charge-coupled device, CCD (not shown), for receiving incident light through a lens 20, and for converting the incident light into an electronic, digital representation of an image 25 that is contained within the incident light, as is well known in the photographic industry. The CCD transfers the electronic representation of the image to a personal computer card (PCC) 30 for storing the image for later retrieval.

However, before storage of the image on the PCC 30, JPEG compression software which is stored on a memory module (not shown) of the camera 10 is used for compressing the digital representation of the image received from the CCD. Such compression is desirable for limiting the amount of memory necessary for storing the digital representation of the image on the PCC 30.

The PCC 30 is inserted into a local computer or workstation 40 for permitting the representation of the image to be decompressed and viewed on a monitor 50 that is electrically connected to the local computer 40. Alternatively, the digital representation of the image 25, which is still in compressed form, may be transmitted to another remote computer or workstation 60 where it is decompressed for viewing on a monitor 70, printing by a printer (not shown) or further processing by a remote user. A software program of the present invention is stored on the remote computer 50 for processing the decompressed digital representation of the image to reduce the occurrence of artifacts for permitting such viewing.

Figure 2:
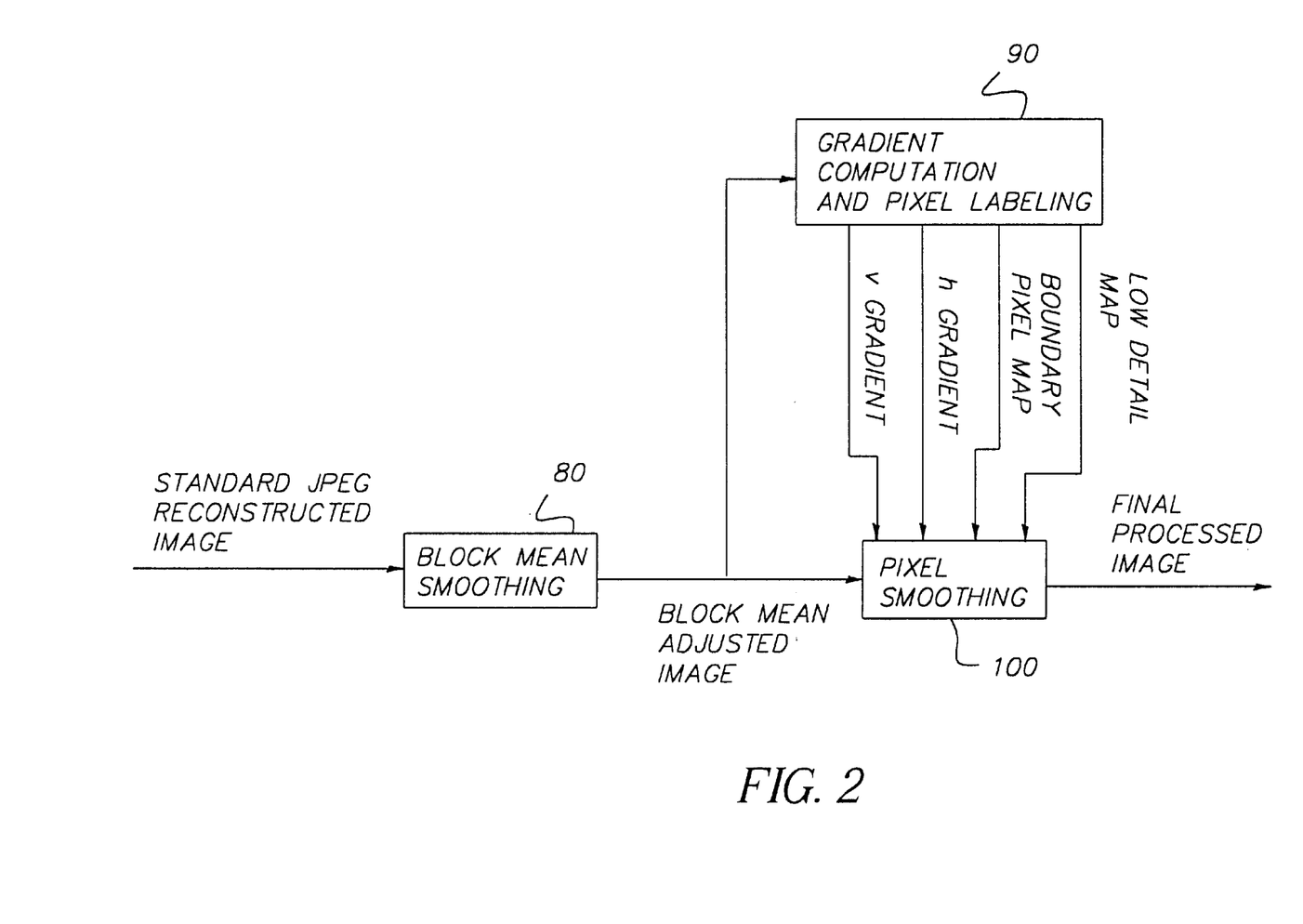
FIG. 2 is a block diagram illustrating an overview of the present invention.

Referring now to FIG. 2, there is shown a graphical illustration of the software program of the present invention for reducing the occurrence of artifacts in the image when it is reconstructed. It is instructive to note that this software, in its preferred embodiment, receives the image in a form that has been compressed by lossy JPEG compressor, and subsequently decompressed by a decoder. The decoder dequantizes the incoming data, and performs an inverse discrete cosine transform operation so that the resulting reconstructed digital image includes 8×8 blocks of pixel values; the decoding operation is well known in the art and will not be discussed in detail herein.

Figure 3:
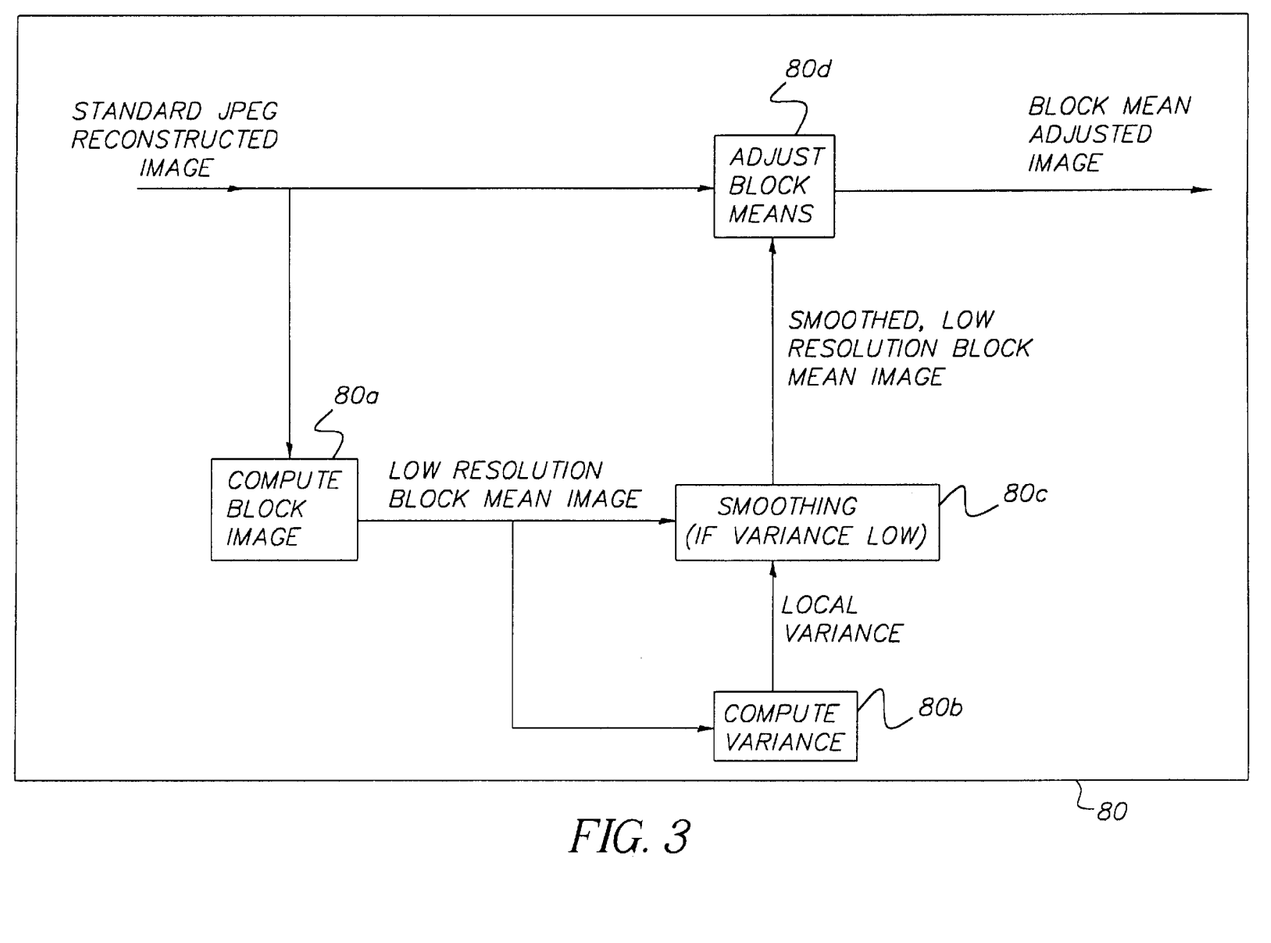
FIG. 3 is an exploded block diagram of a portion of FIG. 2 illustrating a block mean smoother.

Referring now to FIGS. 2 and 3, the reconstructed digital image is input into a block mean smoother 80 that performs an adjustment on the mean value of the image blocks for facilitating the deblocking process. In this regard, the block mean smoother 80 first computes 80a the mean pixel value of each 8×8 block, each of these mean pixel values being referred to hereinafter as a mean block value. For purposes of illustration, if the standard JPEG reconstructed image is 512×512 pixels, the low resolution, block mean image will be an array of 64×64 mean pixel values.

Figure 4:
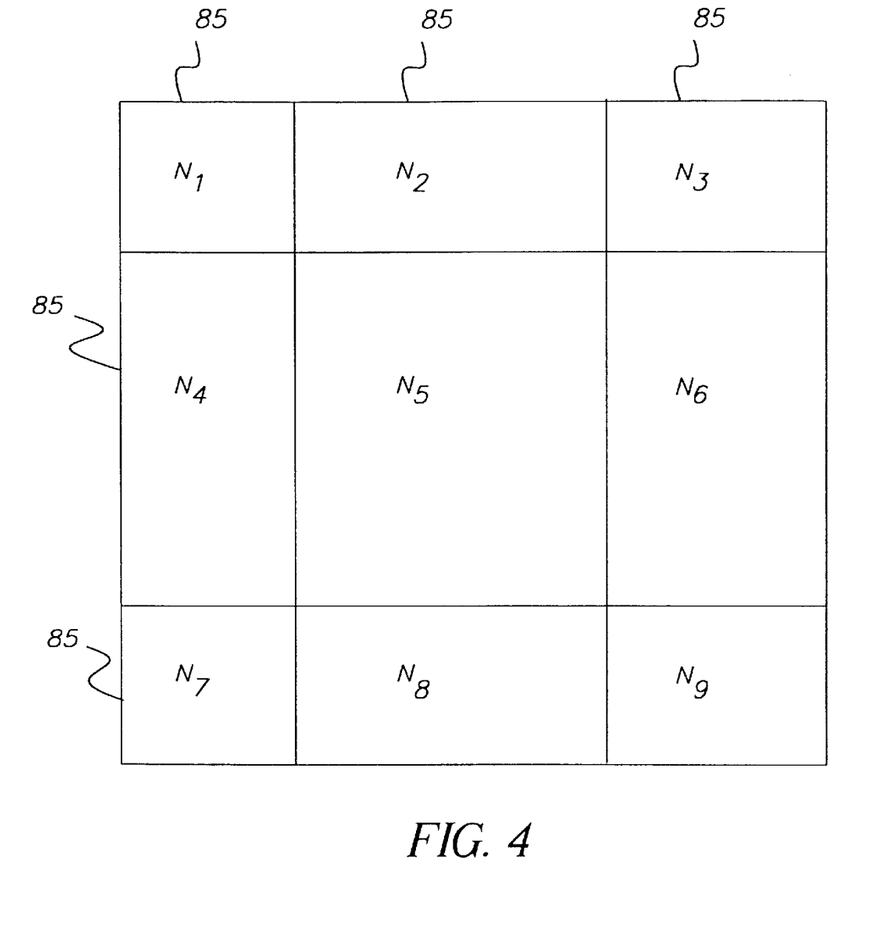
FIG. 4 is a diagram illustrating a 3×3 window used for computing the local variance of FIG. 3.

The local variance of each particular mean block value is then calculated 80b using a 3×3 array centered on the particular mean block value, as illustrated in FIG. 4 where $n_{1-9}$ represent mean block values 85 with the 3×3 array being centered on mean block value $n_5$. In the preferred embodiment, blocks near the edge of the image, so that the block mean array 85 cannot be centered entirely within the image, are left unmodified. Those skilled in the are will realize there are other options for handling these border blocks. Referring back to FIGS. 2 and 3, letting b(m, n) indicate a block mean value, the local variance $\sigma^2_b$ (m, n) in the preferred embodiment is given by $$\sigma_b^2(m, n) = \frac{1}{9} \sum_{i=m-1}^{m+1} \sum_{j=n-1}^{n+1} (b(i, j) - \overline{b}(m, n))^2, \quad (1)$$

where i, j and m,n indicate the block index within the 3×3 array and the block index within the entire image, respectively, and where the term $\overline{b}$ (m, n) is defined by $$\overline{b}(m, n) = \frac{1}{9} \sum_{i=m-1}^{m+1} \sum_{j=n-1}^{n+1} b(i, j). \quad (2)$$

Those skilled in the art will realize that various similar measures of the variance given by Equation (1) can be used with appropriate medications. If the local variance $\sigma^2_b$ (m, n) is less than some threshold 80c, preferably $T_b$=64, then the block mean pixel b(m, n) is replaced by a weighted average of the block mean values in its surrounding 3×3 window of 8×8 block means $80_c$. This weighted average is referred to as $\hat{b}$(m, n) and it is calculated as follows:

$$\hat{b}(m, n) = \sum_{i=m-1}^{m+1} \sum_{j=n-1}^{n+1} w(m-i, n-j)b(i, j), \quad (3)$$

where i, j and m, n again indicate the block index within the 3×3 array and the block index within the entire image, respectively, and where the w is a 3×3 weighting window $$w = \frac{1}{12}\begin{bmatrix} 1 & 1 & 1 \\ 1 & 4 & 1 \\ 1 & 1 & 1 \end{bmatrix}. \quad (4)$$

Other weighting windows can certainly be used if desired as those skilled in the art can determine. An alternative window is as follows:

$$w_2 = \frac{1}{16}\begin{bmatrix} 1 & 2 & 1 \\ 2 & 4 & 2 \\ 1 & 2 & 1 \end{bmatrix}. \quad (5)$$

The pixels in the corresponding block of the full resolution image are adjusted 80*d* so that their mean is equal to the adjusted mean $\hat{b}(m, n)$.

An alternative method for the block mean smoothing is as follows:

As described above, the mean value of a block is replaced by a local average when the local variance of the block means is less than a threshold. This hard thresholding might not be robust in all cases. It is, therefore, suggested that a slightly modified method for block mean smoothing be used that might prove more robust at the cost of extra computation. Specifically, the block mean b(m, n) is found and then $\sigma^2_b$ as in Equation (1) and $\hat{b}(m, n)$ as in Equation (3) are computed. The block mean b(m, n) is then always replaced by a value $\tilde{b}(m, n)$ given by $$\tilde{b}(m, n) = \alpha(m, n)b(m, n) + (1-\alpha(m,n))\hat{b}(m, n) \quad (6)$$

where $$\alpha(m, n) = \frac{\sigma^2_b(m, n)}{\sigma^2_b(m, n) + \sigma^2_{ap}}, \quad (7)$$

and where the parameter $\sigma^2_{ap}$ is defined a priori. As the local variance $\sigma^2_b$ (m, n) increases, $\alpha$(m, n) approaches 1 and $\tilde{b}$ (m, n) tends toward b(m, n), leaving the block mean essentially unchanged. When $\sigma^2_b$ (m, n) is very small, however, $\alpha$(m, n) approaches 0 and $\tilde{b}$ (m, n) approaches $\hat{b}$(m, n). From experimentation, it was found that the results using this alternate method with $\sigma^2_{ap}$=75 were indistinguishable from the results using the hard threshold method described previously.

As should be obvious to those skilled in the art, the block mean smoothing can be effectively implemented in the DCT domain, prior to pixel reconstruction. The low resolution image would then be composed simply of the DC coefficients of each block. Since the DC coefficient is 8 times the mean value of the block, the threshold parameter $T_b$ should be scaled by 64. The modified pixels in this low resolution image become the new DC coefficients for the corresponding block prior to reconstruction of the pixel values.

Figure 5:
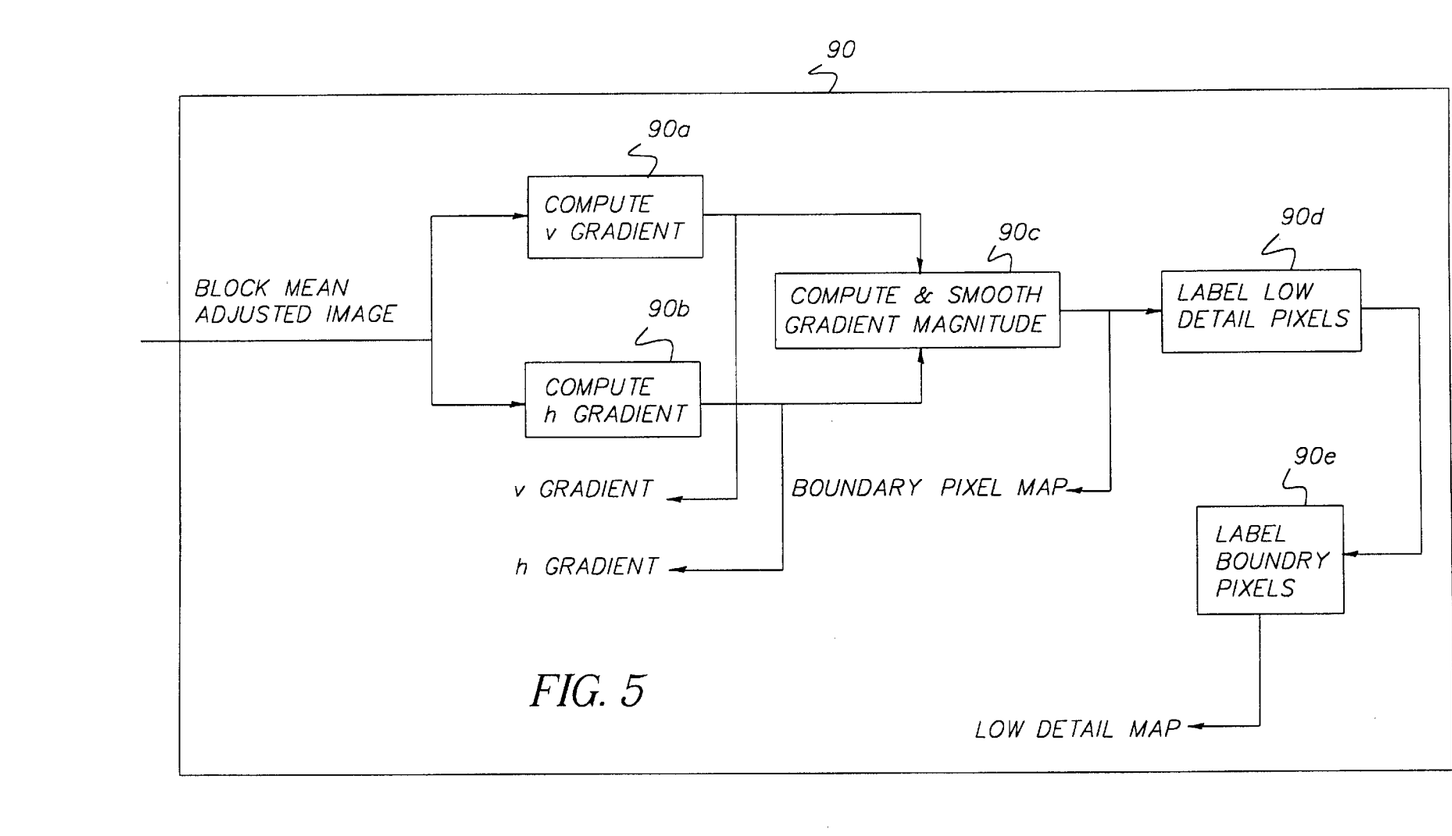
FIG. 5 is an exploded block diagram of a portion of FIG. 2 illustrating gradient computation and pixel labeling; and, FIG. 6 is an exploded block diagram of a portion of FIG. 2 illustrating smoothing of low detail and boundary pixels.

Referring to FIGS. 2 and 5, the block mean adjusted image is input into a gradient computation and pixel labeling processor 90 for defining which pixels are low detail, and which pixels are boundary pixels. As will be fully described hereinbelow, the labels of the pixels are used to determine what type of smoothing, if any, is performed on a given pixel. Gradient values 90*a* and 90*b* are calculated for each pixel value as follows. Letting $G_v$ (m, n) indicate the gradient in the v (vertical) direction at position (m, n) and, similarly $G_h$ (m, n) the gradient in the h (horizontal) direction at (m, n), these gradients, for an image f(m, n) are calculated as follows:

$$G_v(m, n) = \frac{1}{2}(f(m+1, n) - f(m-1, n)) \quad (8a)$$

$$G_h(m, n) = \frac{1}{2}(f(m, n+1) - f(m, n-1)). \quad (8b)$$

These gradient images are stored for later use. Next, a gradient magnitude image, G(m, n) is found 90*c* whose entries are given by $$G(m, n) = \sqrt{G^2_{v(m, n)} + G^2_{h(m, n)}}. \quad (9)$$

This gradient magnitude image is then smoothed 90*c* with a 9×9, separable, Gaussian kernel g whose entries are given by $$g(m, n) = \frac{1}{C_g}\tilde{g}(m, n) = \frac{1}{C_g}\exp\left(-\frac{(0.25m)^2}{2(0.3536)}\right)\exp\left(-\frac{(0.25n)^2}{2(0.3536)}\right) \quad (10)$$

for m, n ∈[ 4,–3, . . . , 3,4] and where $$C_g = \sum_{m=-4}^{4} \sum_{n=-4}^{4} \tilde{g}(m, n) = 31.63L \quad (11)$$

is a normalization factor. For reference, the separable 1-D coefficients of this kernel are $$\frac{1}{\sqrt{31.634}}[0.243, 0.451, 0.702, 0.915, 1.00, 0.915, 0.702, 0.451, 0.243].$$

The resulting smoothed image will hereinafter be referred to as the smoothed gradient image, $G_s$ (m, n). The smoothing reduces the noise in the gradient estimates of Equation (8) and additionally serves to diffuse large gradients so that nearby pixels are not subsequently labeled low detail, which will be described hereinbelow. A pixel in the block mean adjusted image at position (m, n) is labeled low detail 90*d* if $G_s$ (m, n)≤$T_g$, where $T_g$ is a threshold, preferably 4.5521, although those skilled in the art may alter this threshold depending on the desired result. If $G_s$ (m, n)>$T_g$, the pixel at (m, n) is left unlabeled. This labeling results in a binary image, referred to hereinafter as the "low detail map" where a '1' indicates the corresponding pixel is a low detail pixel and a '0' indicates the corresponding pixel is a boundary pixel.

Boundary pixels are identified from the low detail map as follows. A 19×19 square window centered on every '0' in the low detail map (i.e., those pixels not labeled low detail) is preferably used. If this window covers more than one low detail pixel (more than a single '1' in the low detail map), the pixel on which the window is centered is labeled a boundary pixel 90*e*. The result is a binary image where a '1' indicates that the corresponding pixel is a boundary pixel and where all other pixels are labeled a '0'. The resulting map is referred to hereinafter as the "boundary pixel map." At this point, all low detail pixels are indicated by a '1' in the low detail map, all boundary pixels are indicated by a '1' in the boundary pixel map, and all other pixels are left unlabeled. Other means of storing these pixel labels should be evident to those skilled in the art.

Figure 6:
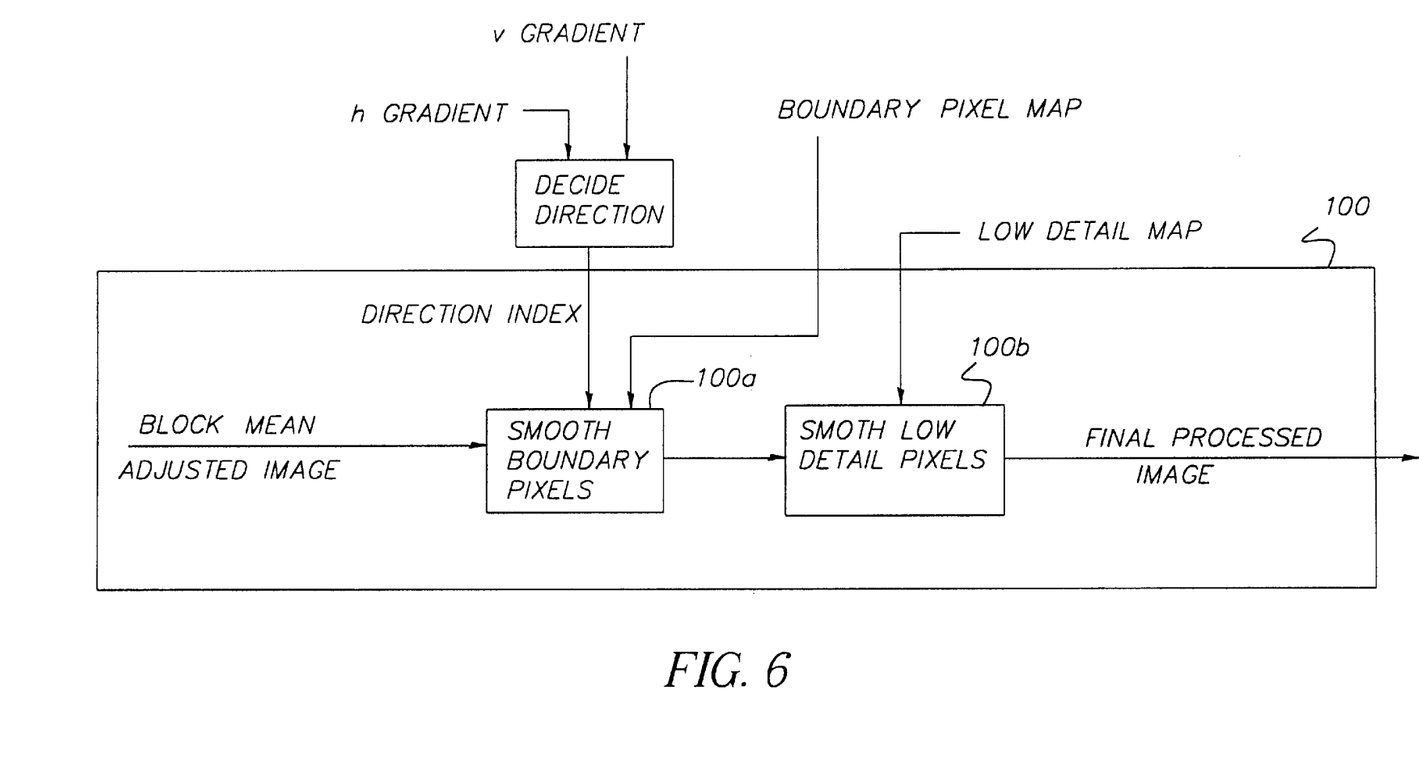

Referring to FIGS. 2 and 6, pixels in the block mean adjusted image are smoothed 100 according to their labels obtained from the gradient computation and pixel labeling processor 90. The boundary pixels are smoothed 100*a* using one of four 5×5 directionally oriented filters whose kernels are given below:

$$d_1 = \frac{1}{108}\begin{bmatrix} 0 & 1 & 4 & 1 & 0 \\ 0 & 4 & 16 & 4 & 0 \\ 0 & 8 & 32 & 8 & 0 \\ 0 & 4 & 16 & 4 & 0 \\ 0 & 1 & 4 & 1 & 0 \end{bmatrix} \quad (12)$$

$$d_2 = \frac{1}{108}\begin{bmatrix} 0 & 0 & 0 & 0 & 0 \\ 1 & 4 & 8 & 4 & 1 \\ 4 & 16 & 32 & 16 & 4 \\ 1 & 4 & 8 & 4 & 1 \\ 0 & 0 & 0 & 0 & 0 \end{bmatrix} \quad (13)$$

$$d_3 = \frac{1}{128}\begin{bmatrix} 4 & 4 & 1 & 0 & 0 \\ 4 & 16 & 8 & 2 & 0 \\ 1 & 8 & 32 & 8 & 1 \\ 0 & 2 & 8 & 16 & 4 \\ 0 & 0 & 1 & 4 & 4 \end{bmatrix} \quad (14)$$

$$d_4 = \frac{1}{128}\begin{bmatrix} 0 & 0 & 1 & 4 & 4 \\ 0 & 2 & 8 & 16 & 4 \\ 1 & 8 & 32 & 8 & 1 \\ 4 & 16 & 8 & 2 & 0 \\ 4 & 4 & 1 & 0 & 0 \end{bmatrix} \quad (15)$$

It is noted that different kernels can be used if desired. Kernels oriented in more directions can also be employed with modifications to the decision process described below. This directional smoothing of the boundary pixels tends to preserve the integrity of edges while reducing edge artifacts such as ringing and/or staircasing.

For a boundary pixel at position (m, n), the kernel used for smoothing is determined from the gradients $G_v$ (m, n) and $G_h$ (m, n) using the following decision process:

if $||G_v(m, n)|-|G_h(m, n)||<T_{dir}$, then
 if sign $[G_v(m, n)]=$sign$[G_h(m, n)]$, then use $d_3$
 else, use $d_4$
else if $|G_v(m, n)|<|G_h(m, n)|$, then use $d_1$
 4. else, use $d_2$.

The effect of this decision process is as follows. If the vertical and horizontal gradients are approximately equal in magnitude, smoothing is performed in one of the diagonal directions (i.e., $d_3$ or $d_4$), according the signs of the two gradients. Otherwise, if the magnitude of the gradient in the vertical direction is smaller than that in the horizontal direction, smoothing is done in the vertical direction (i.e., $d_1$). Otherwise (i.e., the magnitude of the gradient in the horizontal direction is smaller than that in the vertical direction) smoothing is done in the horizontal direction (i.e., $d_2$).

Preferably, $T_{dir}$ is 5. It facilitates understanding to note that the particular filter used depends upon the slope of the edge of the boundary. The low detail pixels are smoothed 100*b* with a large kernel, lowpass filter. In our experiments, we employ an 11×11, separable, Gaussian kernel 1 with entries $$l(m, n) = \frac{1}{C_l}\tilde{l}(m, n) = \frac{1}{C_l}\exp\left(-\frac{(0.2m)^2}{2(0.1880)}\right)\exp\left(-\frac{(0.2n)^2}{2(0.1880)}\right) \quad (16)$$

for m, n∈[−5−4, . . . , 4,5] and where $$C_l = \sum_{m=-5}^{5}\sum_{n=-5}^{5} \tilde{l}(m, n) = 28.915 \quad (17)$$

is a normalization factor. For reference, the separable 1-D coefficients of this kernel are $$\frac{1}{\sqrt{28.915}} \times [0.070, 0.182, 0.384, 0.653,$$
$$0.899, 1.00, 0.899, 0.653, 0.384, 0.182, 0.070].$$

The 11×11 size is chosen so that the kernel always extends significantly across block boundaries, thereby decreasing blocking effects. Again it is noted that other kernels can be employed, as those skilled in the art should find apparent.

The remaining unlabeled pixels are left unchanged. This serves to preserve sharpness in areas where artifacts are masked by texture or other detail. The output of the pixel smoothing stage 100 is the final processed image.

A pseduocode program for performing the steps of the present invention (on a monochrome image or the luminance channel of a color image) is contained in appendix A.

To this point, as mentioned previously, the operation of the present invention has been described for a monochrome image or for a single (luminance) channel of a color image. In the case of color images, the operation of the present invention on the other (chrominance) channels is as follows. One simple, computationally efficient solution would be to apply the current invention to only the luminance channel and leave the other chrominance channels unchanged. Another straightforward implementation would be to apply the current invention on first the luminance channel, as has been described, and then to repeat on each of the other chrominance channels separately. In the preferred embodiment, however, the current invention is applied first to the luminance channel and the resulting information is used to apply the invention to the remaining chrominance channels. as follows. If the mean of a given block in the luminance channel is adjusted 80*d*, the means of the corresponding blocks in the chrominance channels are adjusted as well. The pixel labels from the luminance channel (i.e., the low detail map and the boundary pixel map) are used to label the corresponding pixels in the chrominance channels. The directions selected for filtering the boundary pixels in the luminance channel are used to determine the direction for smoothing the boundary pixels in the chrominance channels. Finally, according to this information from the luminance channel, the low detail and boundary pixels in the chrominance channels are smoothed appropriately.

The invention has been described with reference to a preferred embodiment. However, it will be appreciated that variations and modifications can be effected by a person of ordinary skill in the art without departing from the scope of the invention.

APPENDIX

FOR each block (m, n)
 compute mean of block (m, n)
 compute mean of the other 8 blocks in 3×3 array of blocks centered on block (m, n)
 compute variance of these 9 block means\\ Equation (1), p. 8
 IF variance less than Tb
  \\ Tb=64, p. 8 compute weighted average of the block means\\
  Equation (3), p. 8
modify block (m, n) so that its mean is this weighted average
ELSE
  leave block (m, n) unchanged
END IF \\ Result is block_mean_adjusted_image
END FOR
FOR each pixel (i, j) in block_mean_adjusted_image
  compute v gradient at (i, j) and store in v_gradient_image\\ Equation (8a), p. 11
  compute h gradient at (i, j) and store in h_gradient_image\\ Equation (8b), p. 11
  compute gradient magnitude at (i, j) and store in gradient_magnitude_image
  \\ Equation (9), p. 11
END FOR
initialize label_map to all '0s'
FOR each pixel (i, j) in gradient_magnitude_image
  compute smoothed gradient magnitude at (i, j)
  \\ smoothing kernel given by Equation (10), p. 11
  IF smoothed gradient magnitude at (i, j) less than Tg
  \\ Tg=144, p. 12
    label pixel (i, j) low detail and store 'L' in label_map at (i, j)
    label all surrounding pixels boundary (unless already labeled low detail)
    and store 'Bs' appropriately in label_map (where there aren't 'Ls')
  ELSE
    leave pixel (i, j) unlabeled and leave label_map (i, j) unchanged
  END IF
END FOR
FOR each pixel (i, j) in block_mean_adjusted_image
  IF (i, j) in label_map is 'L' (i.e., if low detail pixel)
    compute low detail smoothed pixel and store in final_image at (i, j)
      \\ kernel given by Equations (15) and (16), p. 14
  ELSE IF (i, j) in label_map is 'B' (i.e., if boundary pixel)
    decide direction for smoothing
      based on (i, j) in x_gradient_image and y_gradient_image\\ see p. 14
    smooth in chosen direction with appropriate kernel and store in final_image at (i, j)
      \\ directional smoothing kernels given in Equations (11)–(14), p. 13
  ELSE (i.e., unlabeled pixel)
    take value of pixel (i, j) in block_mean_adjusted_image and store at (i, j) in final_image
  END IF
END FOR

What is claimed is:

1. A method for preventing artifacts in an electronic image decoded from a block-transform coded representation of an image, the method comprising the steps of:
   (a) receiving blocks of the electronic image decoded from the transform-coded representation of the image;
   (b) determining whether a portion of the decoded image contains low detail pixels;
   (c) determining boundary pixels as pixels within a predetermined area of a predetermined number of low detail pixels;
   (d) based on step (c), filtering the boundary pixels with one of a plurality of directionally-oriented smoothing filters for obtaining one or more boundary replacement pixel values; and
   (e) reconstructing the image by replacing one or more boundary pixels with one or more of the boundary replacement pixel values.

2. The method as in claim 1 further comprising the steps of: filtering the low detail pixels with a smoothing filter for obtaining one or more low-detail replacement pixel values, and reconstructing the image by replacing one or more pixels in the low detail portion with one or more of the replacement low-detail pixels.

3. The method as in claim 1 further comprising the step of adjusting a mean value of one of the blocks depending upon a variation of means of adjacent blocks.

4. The method as in claim 1, wherein step (b) includes: computing vertical and horizontal gradients for a pixel; computing a gradient magnitude for the pixel from the vertical and horizontal gradients; and if the computed gradient magnitude is less than a threshold, labeling the pixel less than the threshold as low detail.

5. The method as in claim 1, wherein step (c) includes determining whether the number of low detail pixels within a predetermined window meets a threshold, and if this threshold is met, labeling as boundary the pixel on which the window is centered.

6. The method as in claim 5 further comprising the step of placing the center of the window on a pixel that has not been previously labeled low detail.

7. The method as in 1 further comprising the steps of computing the vertical and horizontal gradients of the boundary pixels, and based on the computed gradients, using one of a plurality of directionally-oriented filters as a filter for determining boundary replacement values.

8. The method as in claim 7 further comprising the step of forming four filters, each of which is used as the filter based on the gradients of the boundary pixel.

9. The method as in claim 1, wherein step 1(a) includes receiving blocks having a size of 8×8.

10. The method as in claim 1, where step (d) includes using filters ($d_1$–$d_4$) given by:

$$d_1 = \frac{1}{108}\begin{bmatrix} 0 & 1 & 4 & 1 & 0 \\ 0 & 4 & 16 & 4 & 0 \\ 0 & 8 & 32 & 8 & 0 \\ 0 & 4 & 16 & 4 & 0 \\ 0 & 1 & 4 & 1 & 0 \end{bmatrix},$$

$$d_2 = \frac{1}{108}\begin{bmatrix} 0 & 0 & 0 & 0 & 0 \\ 1 & 4 & 8 & 4 & 1 \\ 4 & 16 & 32 & 16 & 4 \\ 1 & 4 & 8 & 4 & 1 \\ 0 & 0 & 0 & 0 & 0 \end{bmatrix},$$

$$d_3 = \frac{1}{128}\begin{bmatrix} 4 & 4 & 1 & 0 & 0 \\ 4 & 16 & 8 & 2 & 0 \\ 1 & 8 & 32 & 8 & 1 \\ 0 & 2 & 8 & 16 & 4 \\ 0 & 0 & 1 & 4 & 4 \end{bmatrix}, \text{ and,}$$

-continued $$d_4 = \frac{1}{128}\begin{bmatrix} 0 & 0 & 1 & 4 & 4 \\ 0 & 2 & 8 & 16 & 4 \\ 1 & 8 & 32 & 8 & 1 \\ 4 & 16 & 8 & 2 & 0 \\ 4 & 4 & 1 & 0 & 0 \end{bmatrix}.$$

11. The method of claim 1 wherein the block transform-coded image is a JPEG-coded image.

12. The method as in claim 3 further comprising the steps of determining whether the variation meets a threshold, and if the threshold is met, computing a mean replacement value for the block meeting the threshold; and modifying pixel values of the block meeting the threshold so that the mean pixel value of the block meeting the threshold equals the mean replacement value.

13. The method as in claim 12, wherein the step of computing the mean replacement value includes computing a weighted average of means of blocks adjacent the block meeting the threshold.

14. A method for preventing artifacts in an electronic image decoded from a block-transform coded representation of an image, the method comprising the steps of:
(a) receiving blocks of the electronic image decoded from the transform-coded representation of the image;
(b) determining whether a portion of the decoded image contains low detail pixels;
(c) determining boundary pixels as pixels within a predetermined area of a predetermined number of the low detail pixels;
(d) based on step (c), filtering the boundary pixels with one of a plurality of filters for obtaining one or more boundary replacement pixel values; and
(e) reconstructing the image by replacing one or more boundary pixels with one or more of the boundary replacement pixel values.

15. The method as in claim 14 further comprising the steps of: filtering the low detail pixels with a smoothing filter for obtaining one or more low-detail replacement pixel values, and reconstructing the image by replacing one or more pixels in the low detail portion with one or more of the replacement low-detail pixels.

16. The method as in claim 14 further comprising the step of adjusting a mean value of one of the blocks depending upon a variation of means of adjacent blocks.

17. The method as in claim 14, wherein step (b) includes: computing vertical and horizontal gradients for a pixel; computing a gradient magnitude for the pixel from the vertical and horizontal gradients; and if the computed gradient magnitude is less than a threshold, labeling the pixel less than the threshold as low detail.

18. The method as in claim 14, wherein step (c) includes determining whether the number of low detail pixels within a predetermined window meets a threshold, and if this threshold is met, labeling as boundary the pixel on which the window is centered.

19. The method as in claim 18 further comprising the step of placing the center of the window on a pixel that has not been previously labeled low detail.

20. The method as in 14 further comprising the steps of computing the vertical and horizontal gradients of the boundary pixels, and based on the computed gradients, using one of a plurality of directionally-oriented filters as a filter for determining boundary replacement values.

21. The method as in claim 20 further comprising the step of forming four directionally-oriented smoothing filters, each of which is used as the filter based on the gradients of the boundary pixel.

22. The method as in claim 14, wherein step (a) includes receiving blocks having a size of 8×8.

23. The method as in claim 14, where step (d) includes using filters ($d_1$–$d_4$) given by:

$$d_1 = \frac{1}{108}\begin{bmatrix} 0 & 1 & 4 & 1 & 0 \\ 0 & 4 & 16 & 4 & 0 \\ 0 & 8 & 32 & 8 & 0 \\ 0 & 4 & 16 & 4 & 0 \\ 0 & 1 & 4 & 1 & 0 \end{bmatrix},$$

$$d_2 = \frac{1}{108}\begin{bmatrix} 0 & 0 & 0 & 0 & 0 \\ 1 & 4 & 8 & 4 & 1 \\ 4 & 16 & 32 & 16 & 4 \\ 1 & 4 & 8 & 4 & 1 \\ 0 & 0 & 0 & 0 & 0 \end{bmatrix},$$

$$d_3 = \frac{1}{128}\begin{bmatrix} 4 & 4 & 1 & 0 & 0 \\ 4 & 16 & 8 & 2 & 0 \\ 1 & 8 & 32 & 8 & 1 \\ 0 & 2 & 8 & 16 & 4 \\ 0 & 0 & 1 & 4 & 4 \end{bmatrix}, \text{ and,}$$

$$d_4 = \frac{1}{128}\begin{bmatrix} 0 & 0 & 1 & 4 & 4 \\ 0 & 2 & 8 & 16 & 4 \\ 1 & 8 & 32 & 8 & 1 \\ 4 & 16 & 8 & 2 & 0 \\ 4 & 4 & 1 & 0 & 0 \end{bmatrix}.$$

24. The method of claim 14 wherein the block transform-coded image is JPEG-coded image.

25. The method as in claim 16 further comprising the steps of determining whether the variation meets a threshold, and if the threshold is met, computing a mean replacement value for the block meeting the threshold; and modifying pixel values of the block meeting the threshold so that the mean pixel value of the block meeting the threshold equals the mean replacement value.

26. The method as in claim 25, wherein the step of computing the mean replacement value includes computing a weighted average of means of blocks adjacent the block meeting the threshold.

* * * * *